United States Patent [19]

Mollberg, Jr.

[11] Patent Number: 4,757,848
[45] Date of Patent: Jul. 19, 1988

[54] STUMP CUTTER

[75] Inventor: Russell E. Mollberg, Jr., Jupiter, Fla.

[73] Assignee: Kinetic Stump Cutter, Inc., Jupiter, Fla.

[21] Appl. No.: 73,713

[22] Filed: Jul. 15, 1987

[51] Int. Cl.⁴ ............................................. A01G 23/06
[52] U.S. Cl. ................................. 144/2 N; 144/218; 144/241
[58] Field of Search ................. 144/2 N, 241, 218, 231

[56] References Cited

U.S. PATENT DOCUMENTS

| | | | |
|---|---|---|---|
| 2,966,180 | 12/1960 | Bles | 144/2 |
| 3,336,958 | 8/1967 | Carlton | 144/2 N |
| 3,461,927 | 8/1969 | Funari | 144/2 |
| 3,620,271 | 11/1971 | Loyer | 144/2 |
| 3,818,957 | 6/1974 | Schoonover | 144/34 |
| 3,931,841 | 1/1976 | Blum | 144/309 |
| 3,935,887 | 2/1976 | Van Zante et al. | 144/2 N |
| 4,041,996 | 8/1977 | Grover | 144/2 |
| 4,074,447 | 2/1978 | Shivers, Jr. et al. | 144/2 N |
| 4,180,107 | 12/1979 | Grover | 144/2 |
| 4,214,617 | 7/1980 | McKenry | 144/2 |
| 4,271,879 | 6/1981 | Shivers et al. | 144/2 |
| 4,493,352 | 1/1985 | Jaakonmaki et al. | 144/162 |

OTHER PUBLICATIONS

Vermeer Mfg. Co. brochure, undated.
Promark Products, Inc. brochure, undated.

Primary Examiner—W. Donald Bray
Attorney, Agent, or Firm—Steele, Gould & Fried

[57] ABSTRACT

An improved stump eradicating device which includes a manually operated carrier member and a rotatable shaft. A cutting wheel is mounted on the shaft and comprises a hub having at its lower end a plurality of slots. Cutting teeth are mounted in the slots and project radially outwardly for contacting a stump to be disintegrated.

6 Claims, 4 Drawing Sheets

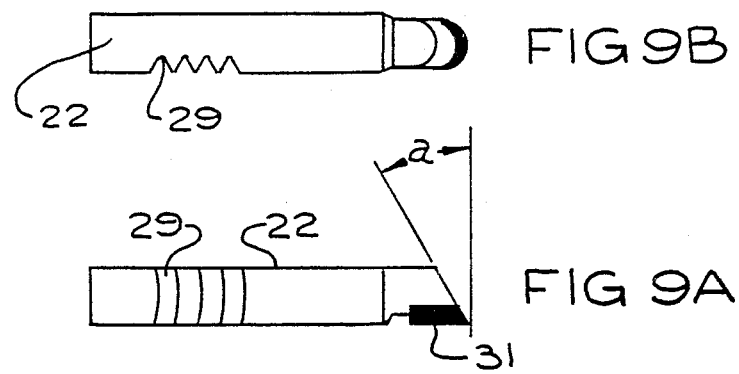
FIG 9B
FIG 9A
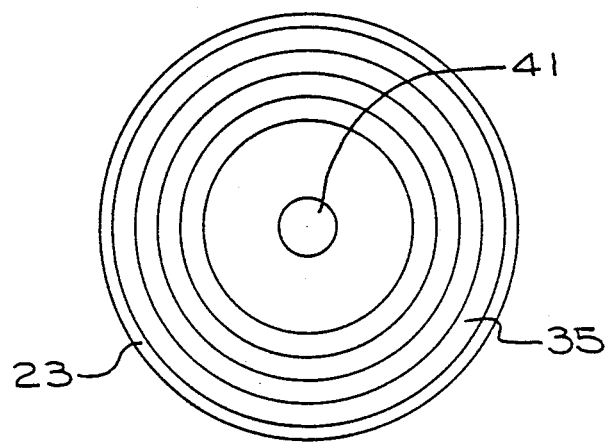
FIG 8
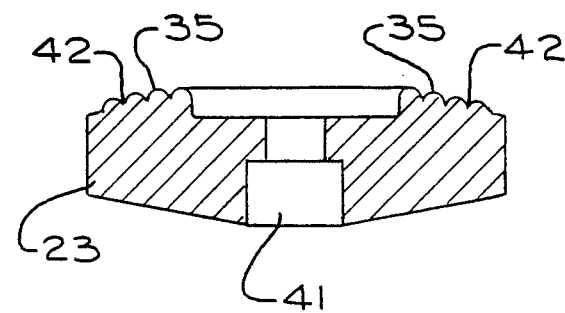
FIG 7

STUMP CUTTER

FIELD OF THE INVENTION

The present invention relates to stump cutters and root cutters for clearing fields. More particularly, the invention relates to a light weight tool for cutting stumps having a plurality of teeth of novel configuration which are rotated at high speeds.

BACKGROUND OF THE INVENTION

Conventional stump cutting and digging devices, which satisfy the requirement for power, generally have been of bulky construction particularly with respect to the boom cutters. This construction prevents the cutter boom from removing tree stumps close to permanent obstructions such as building structures and prevents this device from being transported through, for instance, narrow gates of fenced backyards. Accordingly, those skilled in the art have recognized a significant need for a stump cutter and digging apparatus which overcome the foregoing difficulties.

U.S. Pat. No. 4,041,996 to Grover discloses an apparatus for eradicating tree stumps comprising a rotary cylinder having cutters around its periphery. The cutters are mounted on rings encircling the cylinder.

U.S. Pat. No. 4,214,617 to McKenry discloses a rotatable shank upon which a traverse support bar is attached. Tool holders are mounted in a distributed relation on the support bar and replaceable cutter bits are mounted on tool holders.

The prior stump cutting or removing devices have the disadvantages of being associated with heavy duty vehicles such as tractors, wheeled vehicles or trailers. The operation of the entire system is primarily by skilled operators. The operation of the vehicle is costly especially if it is made operational in order to remove a single stump in a construction area.

There is a need for a lightweight manually operated stump remover which can be readily transported to far away sites, easily stored and readily used by unskilled operators.

SUMMARY OF THE INVENTION

This invention has for a principal object to provide an apparatus for clearing tree stumps by cutting them down to a level below the surface of the ground.

It is a further object of the invention to provide a small manually movable tree stump eradicator which can be easily transported and used by untrained personnel.

It is a further object of the invention to provide a tree stump eradicator which can be utilized in difficult to enter locations and can be easily transported.

It is still a further object of the invention to provide a stump eradicator which does not operate on hydraulic power.

In accordance with the invention there is provided a manually operated tree stump eradicator which comprises the combination of a manually operated carrier having a rotatable shaft and a cutting wheel means mounted on the shaft. The cutting wheel means comprises a cutting wheel means which is capable of being attached to a rotatable shaft. The cutting wheel means at its lower end is provided with a plurality of slot means carrying cutting teeth projecting outwardly and facing in the direction of the rotation. The cutting teeth are held within their respective slots by a cover means.

In a preferred embodiment of the invention the cutting wheel means is mounted on the shaft of a lawn mower type of carrier. That is, the cutting means is mounted on the shaft which would ordinarily carry the rotating grass cutting means of the mower. Advantageously, the carrier pivots about a wheel means so as to raise and lower the cutting wheel means over a tree stump and to manually place the cutting wheel means into position over the stump.

It is another feature of the invention to provide a tree stump eradicator which can be quickly assembled or disassembled, that is rugged in construction, simple in design and operates with precision in small areas.

The cutting wheel means of the present invention can be attached to the shaft of conventional lawn mowers in lieu of their grass cutting means. The lawn mowers are of the type which are manually propelled, self-propelled or of the riding type.

Other objects and a fuller understanding of the invention with be had by referring to the following description and claims of a preferred embodiment, taken in conjunction with the accompanying drawings, wherein like reference characters refer to similar parts throughout the several views.

BRIEF DESCRIPTION OF THE DRAWINGS

FIG. 7 is a side view partially in section of the bottom plate of the cutting wheel;

FIG. 8 is a top view of the bottom plate; and,

FIG. 9a and 9b show the cutting teeth of the invention.

DESCRIPTION OF THE PREFERRED EMBODIMENT OF THE INVENTION

Figure 1:
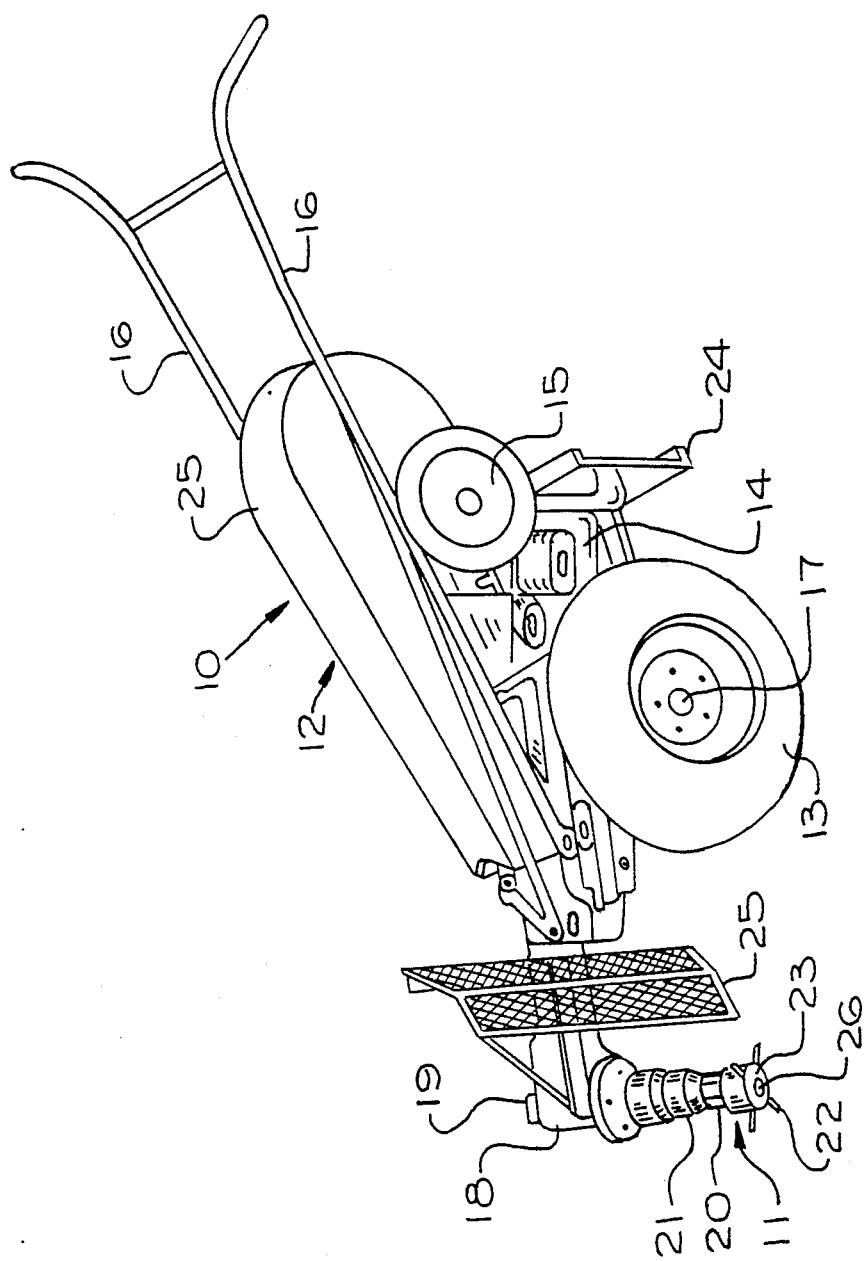
FIG. 1 is a perspective view of a wheeled tree stump eradicator.

Although specific terms are used in the following description for the sake of clarity, these terms are intended to refer only to the particular structure of the invention selected for illustration in the drawings, and are not intended to define or limit the scope of the invention.

FIG. 1 illustrates a tree stump eradicator 10 of the invention which comprises a cutting assembly 11 which is associated with a manually operated carrier 12. The carrier 12 is preferably provided with wheel means 13 on a carriage 14 for movement along the ground.

Mounted on the carriage 14 is a motor 15 that rotates a shaft which causes operation of the cutting assembly 11. Optionally, the motor 15 is also connected for driving the wheel means 13 so as to make the stump eradicating apparatus 10 self-propelled. Motor 15 can comprise two separate motors.

The carriage 14 is mounted so as to pivot about the axle 17 of the wheel means 13. Pivoting and movement of the apparatus 10 is controlled by means of handles 16 which are attached to the carrier 11.

The cutting assembly 11 is driven by the shaft 16 through an adjustable coupling 18 with adjusting means 19, for example a tightening adjuster nut. Coupling 18 permits the angular adjustment of the cutting assembly 11 with respect to a tree stump. The cutting wheel assembly 11 comprises a housing or head 20 which is attached to a suitable connector 21 of the shaft or coupling 18. At the lower end of the cutting head 20 and projecting outwardly is a plurality of cutting teeth 22. The cutting head 20 has at its lower end a removable bottom plate 23 for access to the teeth 22. The coupling 18 generally includes a bearing block 60, which may for example be two thrust bearings, in which a shaft operated by the motor 15 is journaled.

If desired, the cutting wheel assembly 11 may be connected directly to a shaft which is rotatively powered by the motor 15. In which case, the cutting wheel assembly 11 should be positioned at an angle to provide an effective cutting. It has been found that suitable cutting angles for the cutting wheel assembly 11 is between 15 and 30 degrees with respect to the ground.

The tree stump eradication 10 may be provided with other conventional features such as found on lawn mowers. For example, a shield 25 near the cutting wheel assembly 11 as provided to protect the operator from cutting debris. There may also be provided a stand 24 and a cover means 25.

Figure 2:
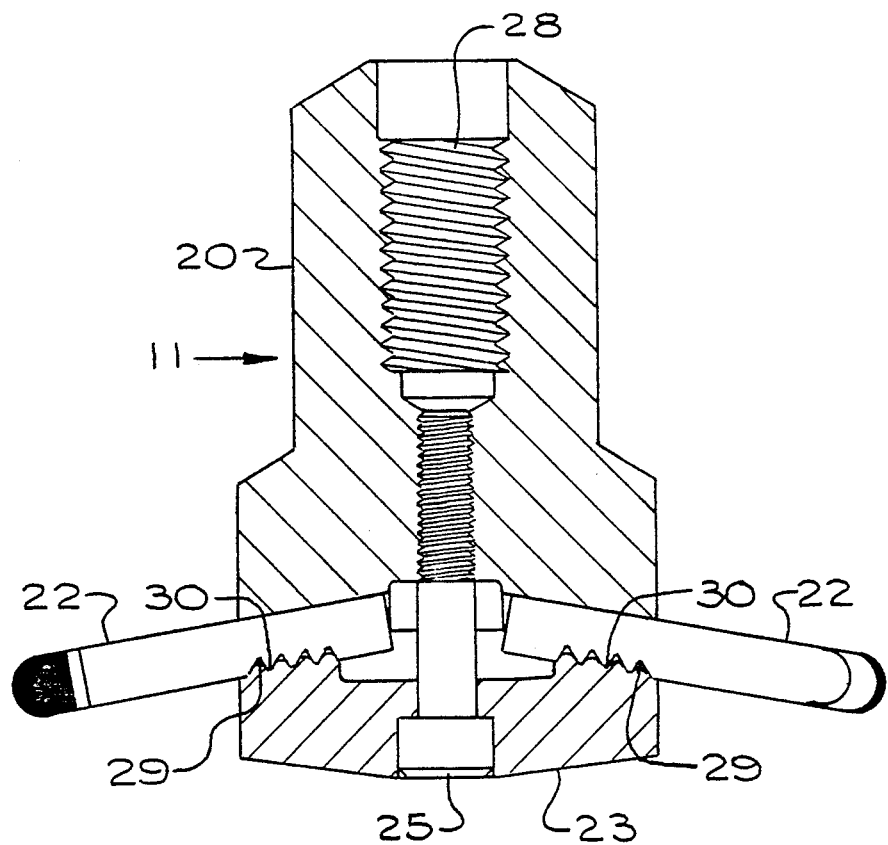
FIG. 2 is a side view partially in section of the cutting wheel of FIG. 1.

FIG. 2 is a partially broken away cross sectional view of the cutting wheel assembly 11. The cutting wheel assembly 11 is composed of a cutting head generally designated as 20, cutting teeth 22 and a bottom plate 23 which is connected to the cutting head 20 by a recessed threaded bolt 25. The cutting head 20 is provided with internal threads 28 for attachment to a journaled shaft or the coupling 18. The threads 28 run counter to the rotation of the assembly 11 so as to prevent loosening during operation. As illustrated, the lower plate 23 with ridges 35 cooperate with associated grooves 30 on the cutting teeth 22 so as to hold the teeth 22 firmly in the cutting wheel assembly 11. If desired, the teeth 22 can be extended outwardly by advancement on the ridges 25.

Figure 3:
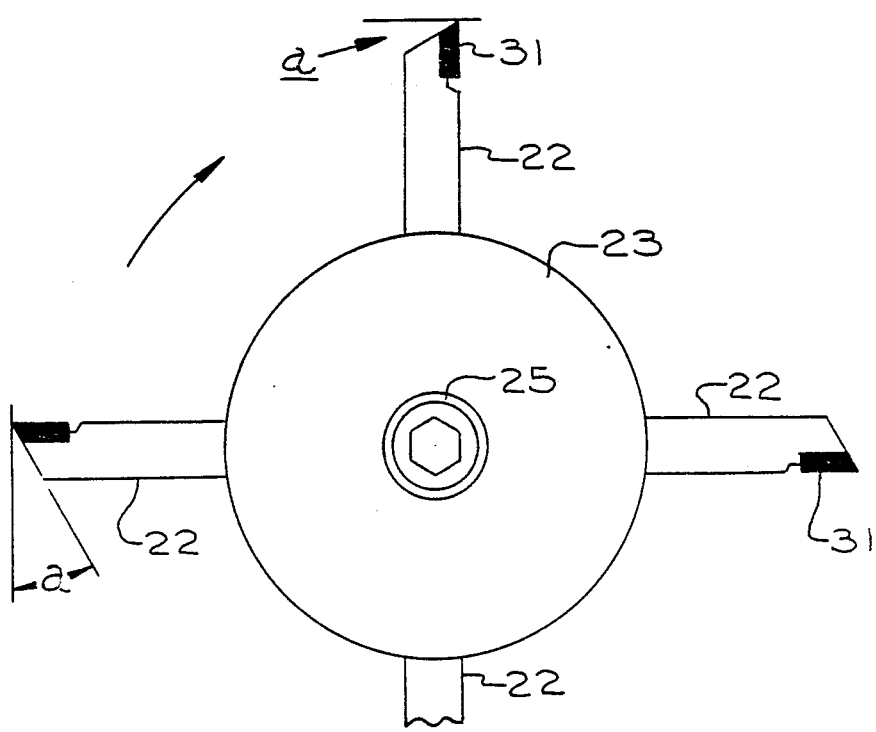
FIG. 3 is a bottom view of the cutting wheel.
Figure 5:
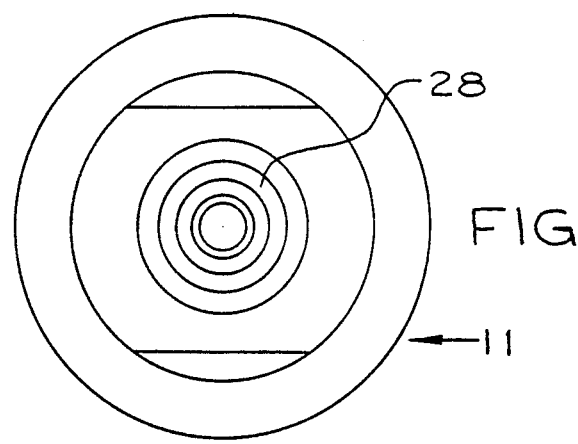
FIG. 5 is a top view of the cutting wheel.

FIG. 3 shows a bottom view of the cutting wheel assembly 11. Preferably, the teeth 22 are spaced substantially equidistant around the periphery. The teeth 22 are provided with a cutting edge 31, and preferably each is provided with a drop off on the shoulder of the teeth forming an angle a of 10 to 30 degrees, most preferably 30 degrees. However, for different types of wood, different shapes of cutting edges may be used.

Figure 4:
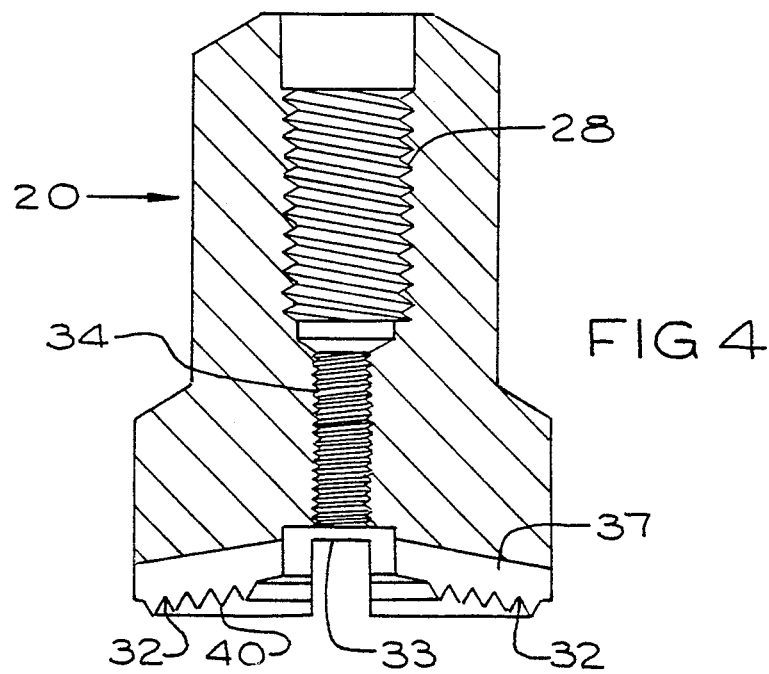
FIG. 4 is a side view partially in section of the cutting means of FIG. 2 without cutting teeth and lower plate.

FIG. 4 illustrates a further embodiment of the invention wherein the lower portion of the cutting head 20 is provided with grooves 32 and ridges 40 so that the grooves are substantially continuous around the cutting head 20 when the teeth 22 lock in V-groove compression together with the bottom plate 23. The bottom portion 37 of the cutting head 20 is concave or beveled since an angle permits better gripping and support of the teeth 22 during the cutting operation when used in combination with an associated grooved and beveled lower plate.

Figure 6:
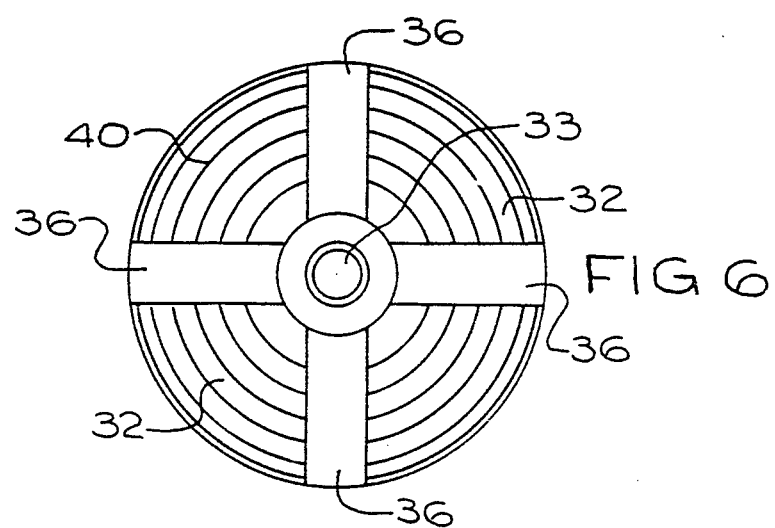
FIG. 6 is a bottom view of the cutting wheel without bottom plate and cutting teeth.

In FIG. 6 there is shown slots 36 at the lower end of the cutting head 20. The cutting head 20 is provided with V-shaped grooves 32 and ridges 40 circling the bottom portion except for the slots 36. The teeth 22 when placed in the slots 36 will have their grooves 30 in alignment with the grooves 32 of the cutting head 20. The cutting head 20 is further provided at one end with an internally threaded bore 28 for attachment to a coupling or shaft for rotating the cutting head 20. At the other end there is provided a threaded bore 34 for receiving the bolt 25 which attaches the cover means 23.

FIGS. 7 and 8 show the end plate 23 which is attached to the cutting head 20 by means of a bolt 25 that is inserted in the recessed bore 41. The end plate 23 has a plurality of circular grooves 42 and ridges 35 which are positioned so as to be associated with the V-grooves 32 and ridges 40 of the cutting head 20. The end plate 23 is preferably slightly beveled so as to be associated with concave configuration of the bottom portion of the cutting head 20.

Although the peaks 35 are shown as being rounded, it is possible to utilize V-shaped peaks in the invention. It has been found to be advantageous to round off the peaks to permit a better distribution of stresses and to prevent chipping. Also, the cover plate is slightly beveled or convex so as to cooperate with the concave configuration of the lower portion of the cutting head 20. The use of the slight concave configuration for the bottom of the cutting head 20 in combination with the slight convex configuration (about 6°–12°) of the plate 23, permits the distribution of the stresses which occur on the cutting teeth 22 during tree stump eradication.

FIGS. 9a and 9b illustrate a typical cutting tooth 22 which may be used in the invention. It has been found that cutting teeth having a sloped shoulder of about 10° to 35°, preferably 30°, are more effective with soft wood. A 10–15 degree slope is preferable for hard wood. Block or square teeth and rounded teeth are equally effective. When the rotation of the cutting head is between 2400 and 2600 rpm, the teeth perform similar to a chain saw. The teeth 22 are preferably comprised of hardened steel with a carbide cutting edge. When the cutting teeth 22 are placed in the slots 36, the grooves 29 of the teeth 22 are in alignment with the grooves 32 of the cutting wheel 11. The bottom plate 23 is placed so that there is a mating of the associated peaks and valleys. The plate 23 is torqued down with the bolt 25 so that the V-shaped ridges 40 of the cutting wheel 11 fit into the grooves 29 of the bottom plate 23.

In operation, when the teeth 20 are placed into the slots 36 of body 20, the grooves 19 of teeth 22 are generally 0.015" above the ridges 40 and grooves 32. The rounded ridges 35 on cover plate 23 make contact with grooves 29 first because they are raised. When cover plate 23 is torqued down with bolt 25 to about 70 ft lbs, the ridges 35 compress into the grooves in teeth 29 and never bottom out on ridges 40 and grooves 32 even though ridges 30 on cover 23 start their entry in the V-grooves of body 20. This ensures complete contact and compression of teeth 32 in slots 36 of body 20.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A manually operated apparatus for eradicating tree stumps and the like comprising in combination:
    a manually operated carrier member having a rotatable shaft;
    a cutting wheel means mounted on said shaft, said cutting wheel means comprising a grooved hub having a concave lower end and capable of attaching to a rotatable shaft; said hub having at its lower end a plurality of slot means;

grooved cutting teeth mounted in said slot means projecting radially outwardly from said hub, said teeth having cutting faces facing in the direction of rotation; and, a grooved convex cover plate mounted on said hub for maintaining said teeth in said hub, said grooves being in alignment with the grooves of said teeth.

2. The apparatus of claim 1, wherein said teeth are adjustable in length of projection.

3. The apparatus of claim 1, including means for adjusting the cutting angle of said cuting wheel means.

4. The apparatus of claim 1, wherein said cutting wheel means is mounted directly on said shaft.

5. The apparatus of claim 1, including wheel means for moving said apparatus.

6. The apparatus of claim 5, wherein said carrier is pivotably mounted on said wheel means.

* * * * *